United States Patent
Ogasawara et al.

(10) Patent No.: US 6,307,865 B1
(45) Date of Patent: Oct. 23, 2001

(54) RADIO COMMUNICATION METHOD AND RADIO COMMUNICATION SYSTEM BETWEEN BASE STATION AND MOBILE STATION

(75) Inventors: Hiromichi Ogasawara; Tsukasa Adachi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/992,294

(22) Filed: Dec. 17, 1997

(30) Foreign Application Priority Data

Dec. 20, 1996 (JP) .................................................. 8-341530

(51) Int. Cl.⁷ ................................. H04J 3/16; H04J 3/18
(52) U.S. Cl. ............................ 370/468; 370/477; 370/337
(58) Field of Search .................................... 370/352, 353, 370/354, 356, 328, 493, 337, 347, 465, 468, 477; 379/93.09

(56) References Cited

U.S. PATENT DOCUMENTS

| | | | | |
|---|---|---|---|---|
| 4,993,022 | * | 2/1991 | Kondo et al. ........................ | 370/468 |
| 5,212,808 | | 5/1993 | Su et al. . | |
| 5,404,573 | * | 4/1995 | Yabe et al. ............................ | 455/423 |
| 5,519,702 | * | 5/1996 | Takahashi ............................. | 370/468 |
| 5,590,397 | * | 12/1996 | Kojima .................................. | 379/59 |
| 5,761,198 | * | 6/1998 | Kojima .................................. | 370/337 |
| 5,774,810 | * | 6/1998 | Sugi ...................................... | 455/502 |
| 5,862,207 | * | 1/1999 | Aoshima ............................... | 379/201 |
| 5,870,391 | * | 2/1999 | Nago .................................... | 370/330 |
| 5,909,432 | * | 6/1999 | Arends et al. ........................ | 370/261 |
| 5,951,709 | * | 9/1999 | Tanaka .................................. | 714/755 |
| 5,987,017 | * | 11/1999 | Lee ........................................ | 370/328 |
| 6,026,084 | * | 2/2000 | Fukuda ................................. | 370/347 |

FOREIGN PATENT DOCUMENTS

| | | |
|---|---|---|
| 0670640 | 6/1995 | (EP) . |
| 4-23629 | 1/1992 | (JP) . |
| 5-304498 | 11/1993 | (JP) . |
| 5-328425 | 12/1993 | (JP) . |
| 6-244792 | 9/1994 | (JP) . |
| 6-292253 | 10/1994 | (JP) . |
| 7193655 | 7/1995 | (JP) . |
| 7-202834 | 8/1995 | (JP) . |
| 8-46565 | 8/1995 | (JP) . |
| 8-79397 | 3/1996 | (JP) . |
| 8-168088 | 6/1996 | (JP) . |

OTHER PUBLICATIONS

Office Action Issued by the Japanese Patent Office on Oct. 20, 1998 and an English Translation Therefor.

(List continued on next page.)

*Primary Examiner*—Chau Nguyen
*Assistant Examiner*—Phuongchau Ba Nguyen

(57) ABSTRACT

The invention provides a radio communication method and a radio communication system which allow data transmission in a wide band regarding a modem modulation signal as a speech signal and allow communication at a high transmission speed without deterioration of the data quality. When a base station receives an analog signal (facsimile or data modem modulation signal) from a public network, a CS switch section connects an analog circuit interface section to a CS-PCM/CODEC section. The CS-PCM/CODEC section modulates the modem modulation signal into a PCM signal of 64 kbps, which is then demultiplexed into two signals equivalent to ADPCM signals of 32 kbps by a CS demultiplexing section. Thereafter, a CS channel CODEC section allocates the two signals equivalent to ADPCM signals of 32 kbps to two time slots and transmits the data through two radio circuits. A base station performs demodulation of received data into an analog signal by a processing procedure reverse to that by the base station. Communication is performed with a wide bandwidth of 64 kbps regarding a modem modulation signal as a speech signal.

10 Claims, 4 Drawing Sheets

OTHER PUBLICATIONS

Office Action Issued by the Japanese Patent Office for the Corresponding Japanese Application on Apr. 13, 1999 and an English Translation Therefor.

Office Action Issued by the German Patent Office for the Corresponding German Application on Jan. 7, 1998 and an English Translation Thereof.

Althammer, S.; Bruckmann, D.: Highly–Optimized ICS for Dect Cordless Telephones. IN: Components 31, 1993, Issue 6, pp. 215 to 218.

* cited by examiner

RADIO COMMUNICATION METHOD AND RADIO COMMUNICATION SYSTEM BETWEEN BASE STATION AND MOBILE STATION

BACKGROUND OF THE INVENTION

1. Field of the Invention

This invention relates to a radio communication method and a radio communication system between a base station and a mobile station which are applied to a digital cordless telephone system which makes use of a personal handyphone system (PHS) and by which communication by a modem modulation signal such as a facsimile modem signal or a data modem signal or a speech signal is performed by demultiplexing of a PCM (Pulse Code Modulation) signal of 64 kbps and an ADPCM (Adaptive Differential PCM) signal of 32 kbps.

2. Description of the Related Art

A digital cordless telephone system which makes use of a handyphone system (PHS) is conventionally used. An exemplary one of such digital cordless telephone systems is disclosed, for example, in Japanese Patent Laid-Open Application No. Heisei 5-328425.

The cordless telephone system disclosed in the document mentioned above is directed to realization of talking of a high quality by an ADPCM signal of 32 kbps. Further, as a multiplexing system for a speech signal, a circuit having a transmission speed of 64 kbps such as an ISDN (Integrated Services Digital Network) is used. In the multiplexing system, an ADPCM signal of 32 kbps is multiplexed to allow duplex communication by 32 kbps.

In this instance, a mutual exchanging apparatus between a µ-law, A-law system of 64 kbps as a digitalization sampling system for a speech signal and an ADPCM system of 32 kbps is provided to allow setting of which one of the systems should be used. By such mutual exchanging processing, if, during communication using the ADPCM system of 32 kbps, a new request for communication to the same communication destination is received, additional communication using the same circuit is possible.

However, in the conventional cordless telephone system described above which is directed to realization of talking of a high quality by an ADPCM signal of 32 kbps, when a base station connected to a public network performs data transmission through a radio circuit regarding a modem modulation signal from a facsimile (FAX) modem or a data modem as a speech signal, a PHS mobile station which receives the ADPCM signal of 32 kbps by the transmission converts the ADPCM signal of 32 kbps having a narrow bandwidth once into an analog signal and sends out the analog signal to the facsimile machine or data terminal.

Consequently, the data quality is deteriorated considerably and besides the transmission speed is dropped. In this instance, the transmission speed of 9,600 bps is guaranteed for practical use. This also applies to another case wherein a base station is connected to an ISDN network.

SUMMARY OF THE INVENTION

It is an object of the present invention to provide a radio communication method and a radio communication system which allow, where they are applied to a digital cordless telephone system or the like which makes use of a handyphone system (PHS) connected to an analog circuit or an ISDN network, data transmission in a wide band regarding a modem modulation signal from a modem of a facsimile machine or a data terminal as a speech signal and allow communication at a high transmission speed without deterioration of the data quality.

In order to attain the object described above, according to an aspect of the present invention, there is provided a radio communication method for a radio communication system which includes a base station connected to an analog network and a mobile station connected to the base station by a radio circuit, wherein the base station performs, when an analog signal which is a modem modulation signal such as a facsimile modem signal or a data modem signal is received from the analog network, PCM/CODEC processing of the analog signal, modulates the analog signal into a PCM signal of a high transmission speed, separates the PCM signal into two ADPCM signals of a low transmission speed, allocates the two ADPCM signals of the low transmission speed to two time slots by channel CODEC processing and performs data transmission as two radio communications through the radio circuit, and the mobile station demodulates the data received from the base station into an analog signal by a processing procedure reverse to the processing procedure by the base station and performs communication of the analog signal with a wide bandwidth of the high transmission speed regarding the analog signal as a speech signal.

The base station may perform, when a speech signal which is an analog signal is received from the analog network, ADPCM/CODEC processing for the speech signal, allocate the one ADPCM signal to one time slot and perform data transmission through the one radio circuit.

According to another aspect of the present invention, there is provided a radio communication method for a radio communication system which includes a base station connected to an ISDN network and a mobile station connected to the base station by a radio circuit, wherein the base station separates a modem modulation signal such as a facsimile modem signal or a data modem signal which is a PCM signal of a high speed sent thereto from the ISDN network into two ADPCM signals of a low transmission speed, allocates the two ADPCM signals of the low transmission speed to two time slots by channel CODEC processing and performs data transmission as two radio communications through the radio circuit, and the mobile station demodulates the data received from the base station into an analog signal by a processing procedure reverse to the processing procedure by the base station and performs communication of the analog signal with a wide bandwidth of the high transmission speed regarding the analog signal as a speech signal.

The base station may perform, when the PCM signal of the high transmission speed sent thereto from the ISDN network is a speech signal, PCM/ADPCM processing to convert the speech signal of the received PCM signal into an ADPCM signal of the low transmission speed, allocate the one ADPCM signal to one time slot and perform data transmission through the one radio circuit.

A radio communication system according to the present invention may have two forms including a form wherein it comprises a radio base station connected to an analog network and a mobile station connected to the base station by a radio circuit and another form wherein it comprises a radio base station connected to an ISDN network and a mobile station connected to the base station by a radio circuit. Where the radio communication system has the former form, the base station includes a main control section for controlling components of the base station, an analog circuit interface section for receiving an analog signal from the analog network, a signal type discrimination section for discriminating whether the analog signal received by the analog circuit interface section is a modem modulation signal from a facsimile modem or a data modem or a speech signal, a PCM/CODEC section for modulating the analog signal from the analog circuit interface section into a PCM signal of 64 kbps and for conversely demodulating a PCM signal of 64 kbps into an analog signal, an ADPCM/CODEC section for modulating the analog signal from the analog circuit interface section into an ADPCM signal of 32 kbps and for conversely demodulating an ADPCM signal of 32 kbps into an analog signal, a switch section for switching connection of the analog circuit interface section alternatively to the PCM/CODEC section or the ADPCM/CODEC section, a demultiplexing section for demultiplexing a PCM signal of 64 kbps and an ADPCM signal of 32 kbps, a channel CODEC section for performing allocation of communication channels to time slots of the radio circuit and performing framing and deframing of radio frames of a control channel and a communication channel, and a radio interface section for receiving data from the radio circuit and transmitting data through the radio circuit.

Meanwhile, the mobile station includes a main control section for controlling components of the mobile station, a radio interface section for receiving data from the base station through the radio circuit and transmitting data through the radio circuit, a channel CODEC section for performing allocation of communication channels to time slots of the radio circuit and performing framing and deframing of radio frames of a control channel and a communication channel, a demultiplexing section for performing demultiplexing of a PCM signal of 64 kbps and an ADPCM signal of 32 kbps, a PCM/CODEC section for demodulating a PCM signal of 64 kbps into an analog signal and for conversely modulating an analog signal into a PCM signal of 64 kbps, an ADPCM/CODEC section for demodulating an ADPCM signal of 32 kbps into an analog signal and for conversely modulating an analog signal into an ADPCM signal of 32 kbps, an analog interface section for performing inputting and outputting processing of an analog signal, a switch section for switching the connection of the analog interface section to the PCM/CODEC section or the ADPCM/CODEC section, and a signal type discrimination section for discriminating whether or not an analog signal received by the analog interface section is a modem modulation signal such as a facsimile modem signal or a data modem signal or a speech signal.

On the other hand, where the radio communication system has the second-mentioned form wherein the radio base station is connected to an ISDN network, the base station includes a main control section for controlling components of the base station, a digital circuit interface section for receiving a PCM signal of 64 kbps from the ISDN network, a signal type discrimination section for discriminating whether the digital signal received by the digital circuit interface section is a modem modulation signal such as a facsimile modem signal or a data modem signal or a speech signal, a PCM/ADPCM conversion section for performing conversion between a PCM signal of 64 kbps and an ADPCM signal of 32 kbps, a demultiplexing section for demultiplexing a PCM signal of 64 kbps and an ADPCM signal of 32 kbps, a switch section for switching connection of the digital circuit interface section alternatively to the demultiplexing section or the PCM/ADPCM conversion section, a channel CODEC section for performing allocation of communication channels to time slots of the radio circuit and performing framing and deframing of radio frames of a control channel and a communication channel, and a radio interface section for receiving data from the radio circuit and transmitting data through the radio circuit.

Meanwhile, the mobile station is constructed in a similar manner to the mobile station in the radio communication system of the form wherein the base station is connected to the analog circuit.

It is to be noted that the base station and the mobile station may be constructed such that they may perform transmission by signal processing reverse to that upon reception. Further, the base station and the mobile station may be constructed so as to serve as a parent machine and a child machine, respectively, of a digital cordless telephone system which makes use of a handyphone system.

With the radio communication methods and the radio communication systems described above, where the base station is connected to an analog network, if the analog signal sent thereto from the analog network is a modem modulation signal such as a facsimile modem signal or a data modem signal, the analog signal is modulated into a PCM signal of a high transmission speed (64 kbps). Further, the PCM signal is demultiplexed into two ADPCM signals of a low transmission speed (32 kbps), and the two ADPCM signals of the low transmission speed are allocated to two time slots by channel CODEC processing and data transmission is performed as two radio communications through the radio circuit.

Thus, where the radio communication methods and the radio communication systems described above are applied to a digital cordless telephone system which makes use of a handyphone system (PHS) connected to an analog circuit, data transmission with a wide band can be performed regarding a modem modulation signal from a modem of a facsimile machine or a data terminal as a speech signal and communication of a high quality at a high transmission speed can be achieved.

On the other hand, where the base station is connected to an ISDN network, a PCM signal of a high transmission speed (64 kbps) in the form of a modulation signal such as a facsimile modem signal or a data modem signal sent from the ISDN network to the base station is separated into two ADPCM signals of a low transmission speed (32 kbps). Then, the two ADPCM signals of the low transmission speed are allocated to two time slots, and data transmission is performed as two radio communications through the radio circuit.

Thus, also in this instance, data transmission with a wide band can be performed when an ISDN network is used, and communication of a high quality at a high transmission speed can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
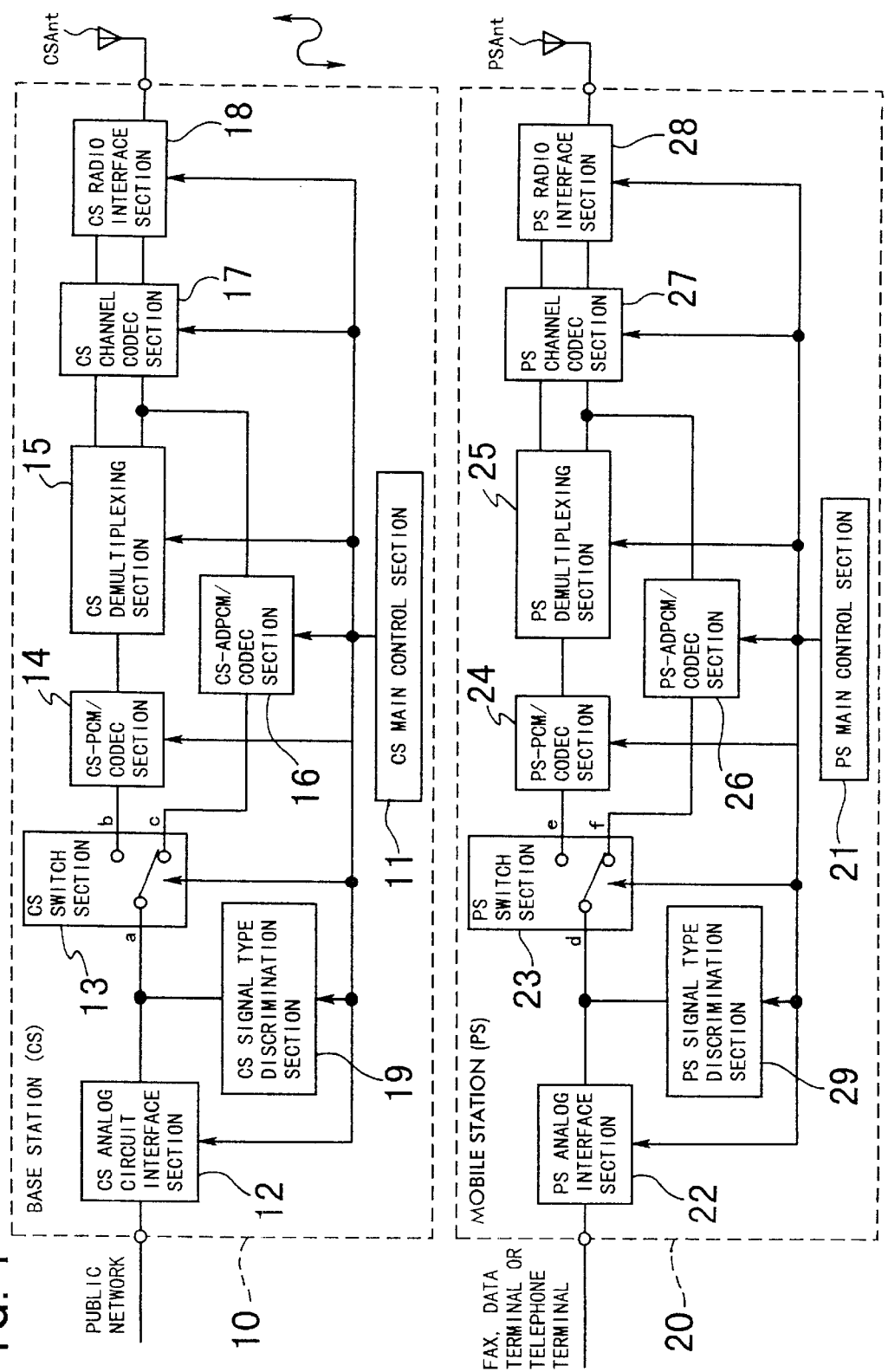
FIG. 1 is a block diagram of a radio communication system to which the present invention is applied.

Referring first to FIG. 1, there is shown in block diagram a radio communication system to which the present invention is applied.

The radio communication system shown in FIG. 1 is constructed as a digital cordless telephone system which makes use of a handyphone system. The radio communication system includes a base station (CS) 10 and a mobile station (PS) 20 which serve as a parent machine and a child machine, respectively.

The base station (CS) 10 includes a CS main control section 11 for controlling components of the base station (CS) 10, and a CS analog circuit interface (I/F) section 12 for receiving an analog signal sent thereto from a public network (analog network). The base station (CS) 10 further includes a CS signal type discrimination section 19 for discriminating whether an analog signal received by the CS analog circuit interface section 12 is a modulation signal from a facsimile modem or a data modem or a speech signal.

The base station (CS) 10 further includes a CS-PCM/CODEC section 14 for modulating an analog signal received by the CS analog circuit interface section 12 into a PCM signal of 64 kbps and for conversely demodulating a PCM signal of 64 kbps into an analog signal.

The base station (CS) 10 further includes a CS-ADPCM/CODEC section 16 for modulating an analog signal received by the CS analog circuit interface section 12 into an ADPCM signal of 32 kbps and for conversely demodulating an ADPCM signal of 32 kbps into an analog signal.

The base station (CS) 10 further includes a CS switch section 13 for connecting the CS analog circuit interface section 12 alternatively to the CS-PCM/CODEC section 14 or the CS-ADPCM/CODEC section 16.

The base station (CS) 10 further includes a CS demultiplexing section 15 for demultiplexing a PCM signal of 64 kbps into two signals equivalent to ADPCM signals of 32 kbps, and a CS channel CODEC section 17 for performing allocation of communication channels to time slots in the radio circuit and performing framing and deframing of radio frames of a control channel and a communication channel. The control channel and communication channel are used to control the transmission and send and receive data. The framing and deframing of radio frames enables communications to be broken into packets and transmitted with error checking algorithms.

The base station (CS) 10 further includes a CS radio interface section 18 for receiving data sent thereto through the radio circuit by means of a CS antenna Ant and performing transmission of data through the radio circuit (CS antenna Ant).

Meanwhile, the mobile station (PS) 20 of the communication system includes a PS main control section 21 for controlling components of the mobile station (PS) 20, a PS radio interface (I/F) section 28 for receiving data sent thereto from the base station (CS) 10 through the radio circuit by means of the PS antenna Ant and performing data transmission through the radio circuit (PS antenna Ant), and a PS channel CODEC section 27 for performing allocation of communication channels to time slots in the radio circuit and performing framing and deframing of radio frames of a control channel and a communication channel. The mobile station (PS) 20 further includes a PS demultiplexing section 25 for performing demultiplexing of a PCM signal of 64 kbps and two signals equivalent to ADPCM signals of 32 kbps.

The mobile station (PS) 20 further includes a PS-PCM/CODEC section 24 for demodulating a PCM signal of 64 kbps into an analog signal and for conversely modulating an analog signal into a PCM signal of 64 kbps, and a PS-ADPCM/CODEC section 26 for demodulating an ADPCM signal of 32 kbps into an analog signal and for conversely modulating an analog signal into an ADPCM signal of 32 kbps. The mobile station (PS) 20 further includes a PS analog interface (I/F) section 22 for performing processing of input and output signals each in the form of an analog signal.

The mobile station (PS) 20 further includes a PS switch section 23 for switching the connection of the PS analog interface section 22 to the PS-PCM/CODEC section 24 or the PS-ADPCM/CODEC section 26, and a PS signal type discrimination section 29 for discriminating whether or not an analog signal received by the PS analog interface section 22 is a modem modulation signal from a facsimile modem or a data modem or a speech signal.

Figure 2:
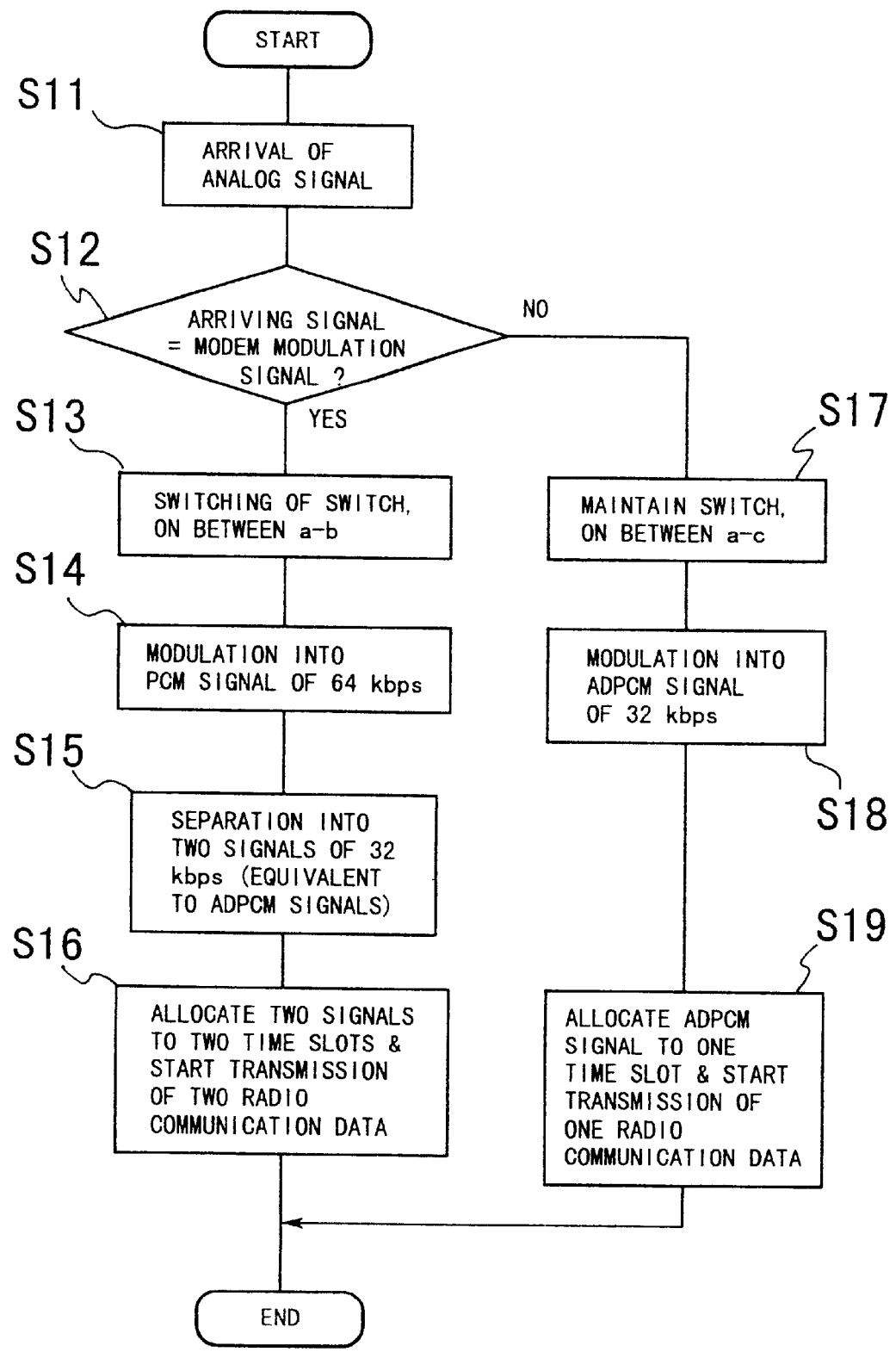
FIG. 2 is a flow chart illustrating a processing procedure of operation of the radio communication system of FIG. 1 before data transmission of a base station is started.
Figure 3:
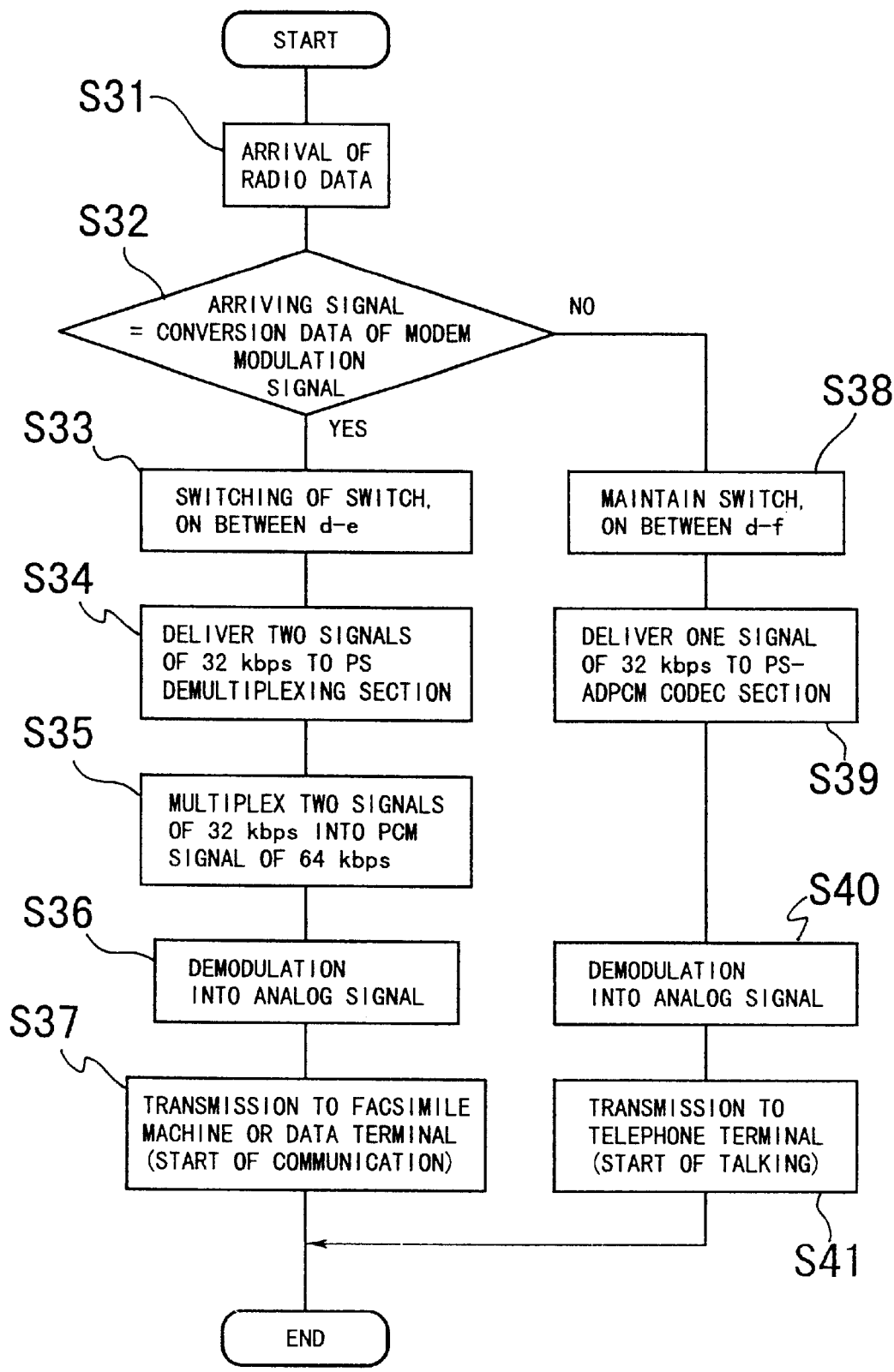
FIG. 3 is a flow chart illustrating a processing procedure of operation of the radio communication system of FIG. 1 before communication and talking of a mobile station is started.

Operation of the radio communication system is described in detail below with reference to FIGS. 1, 2 and 3. FIG. 2 illustrates in flow chart a processing procedure of operation of the radio communication system before data transmission of the base station (CS) is started, and FIG. 3 illustrates in flow chart a processing procedure of operation of the radio communication system before communication and talking of the mobile station (PS) is started.

First, in an initial state, the CS switch section 13 of the base station (CS) 10 is in a switched state wherein it connects the CS analog circuit interface section 12 to the CS-ADPCM/CODEC section 16 (on between a–c). Meanwhile, it is assumed that the PS switch section 23 of the mobile station (PS) 20 is connected to the PS-ADPCM/CODEC section 26 side (on between d–f).

If the base station (CS) 10 receives an analog signal sent thereto from a public network (analog network) at the CS analog circuit interface section 12 thereof (step S11), then the CS signal type discrimination section 19 discriminates whether or not the received analog signal is a modem modulation signal from a facsimile modem or a data modem or a speech signal (step S12). For the discrimination, for example, a method of detecting an answer tone of 2,100 Hz or, particularly from a facsimile modem, a CNG signal is available.

If the analog signal is a modem modulation signal from a facsimile modem or a data modem, then the CS switch section 13 disconnects the CS analog circuit interface section 12 from the CS-ADPCM/CODEC section 16 (off between a–c) and now connects the CS analog circuit interface section 12 to the CS-PCM/CODEC section 14 (on between a–b) under the control of the CS main control section 11 (step S13).

Since the CS switch section 13 connects the CS analog circuit interface section 12 to the CS-PCM/CODEC section 14 in this manner, a path is formed for the CS-PCM/CODEC section 14, and the CS-PCM/CODEC section 14 thus modulates the received modem modulation signal into a PCM signal of 64 kbps (step S14).

The CS demultiplexing section 15 demultiplexes the modulated PCM signal of 64 kbps into two signals equivalent to ADPCM signals of 32 kbps (step S15). The CS channel CODEC section 17 allocates the two signals equivalent to ADPCM signals of 32 kbps to two time slots and transmits them as two radio communications from the CS radio interface section 18 through the radio circuit (CS antenna Ant) (step S16).

When the mobile station (PS) 20 receives the data sent thereto through the radio circuit by the PS antenna Ant and the PS radio interface section 28 (step S31 in FIG. 3), the PS signal type discrimination section 29 discriminates whether the received data are conversion data of a modem modulation signal which has been allocated to two time slots and transmitted separately as such or conversion data of a speech signal which has been allocated to one time slot and transmitted as such (step S32).

If the discrimination reveals that the received data are conversion data of a modem modulation signal allocated to two time slots and transmitted separately as such, then the PS switch section 23 disconnects the PS analog interface section 22 from the PS-ADPCM/CODEC section 26 (off between d–f) and now connects the PS analog interface section 22 to the PS-PCM/CODEC section 24 (on between d–e) under the control of the PS main control section 21 (step S33).

For the discrimination, for example, a method wherein, when two call termination requests arrive at the mobile station (PS) 20 from the base station (CS) 10 during communication control, the received data are discriminated to be conversion data of a modem modulation signal is available.

The two signals allocated to two time slots and equivalent to ADPCM signals of 32 kbps are separated by the PS channel CODEC section 27 and forwarded to the PS demultiplexing section 25 (step S34). The PS demultiplexing section 25 multiplexes the two signals equivalent to ADPCM signals of 32 kbps and demodulates the multiplexed signal into a PCM signal of 64 kbps (step S35). The PS-PCM/CODEC section 24 demodulates the received PCM signal of 64 kbps into an analog signal (step S36).

Through the PS analog interface section 22 for which a path has been formed by selection of the PS-PCM/CODEC section 24 by the PS switch section 23 under the control of the PS main control section 21, the demodulated modem modulation signal is transmitted to the facsimile machine, data terminal or the like thereby to start communication (step S37).

On the other hand, if the analog signal received by the CS analog circuit interface section 12 of the base station (CS) 10 is a speech signal (step S12 in FIG. 3), whether or not the analog signal is a speech signal is discriminated by the CS signal type discrimination section 19. The CS switch section 13 forms a path immediately without cutting the connection between the CS analog circuit interface section 12 and the CS-ADPCM/CODEC section 16 (on between a–c) (step S17 in FIG. 3). The CS-ADPCM/CODEC section 16 for which a path has been formed in this manner modulates the received speech signal into an ADPCM signal of 32 kbps (step S18).

Further, the CS channel CODEC section 17 allocates the modulated ADPCM signal to one time slot and transmits it as one radio communication through the radio circuit via the CS radio interface section 18 and the CS antenna Ant (step S19). The mobile station (PS) 20 receives the data sent thereto through the radio circuit using the PS antenna Ant and the PS radio interface section 28. Then, when the data are conversion data of a speech signal allocated to one time slot, the PS signal type discrimination section 29 discriminates that the data are a speech signal.

Here, the PS switch section 23 forms a path immediately without cutting the connection between the PS analog interface section 22 and the PS-ADPCM/CODEC section 26 (on between d–f) under the control of the PS main control section 21 (step S38 of FIG. 3).

The ADPCM signal of 32 kbps allocated to one time slot is inputted to the PS-ADPCM/CODEC section 26, by which it is subsequently demodulated into an analog signal (step S40). The thus demodulated analog signal is transmitted as a speech signal to the telephone terminal through the PS-ADPCM/CODEC section 26 and the PS switch section 23 and through the PS analog interface section 22 for which a path has been formed thereby to perform talking (step S41).

On the other hand, when transmission from the radio communication system is to be performed, the mobile station (PS) 20 discriminates, by the PS signal type discrimination section 29 thereof, whether an analog signal received by the PS analog interface section 22 is a modem modulation signal of a facsimile modem or a data modem or a speech signal and switches the PS switch section 23 in accordance with the discrimination. Thereafter, a procedure reverse to that for the termination is performed thereby to perform talking.

Figure 4:
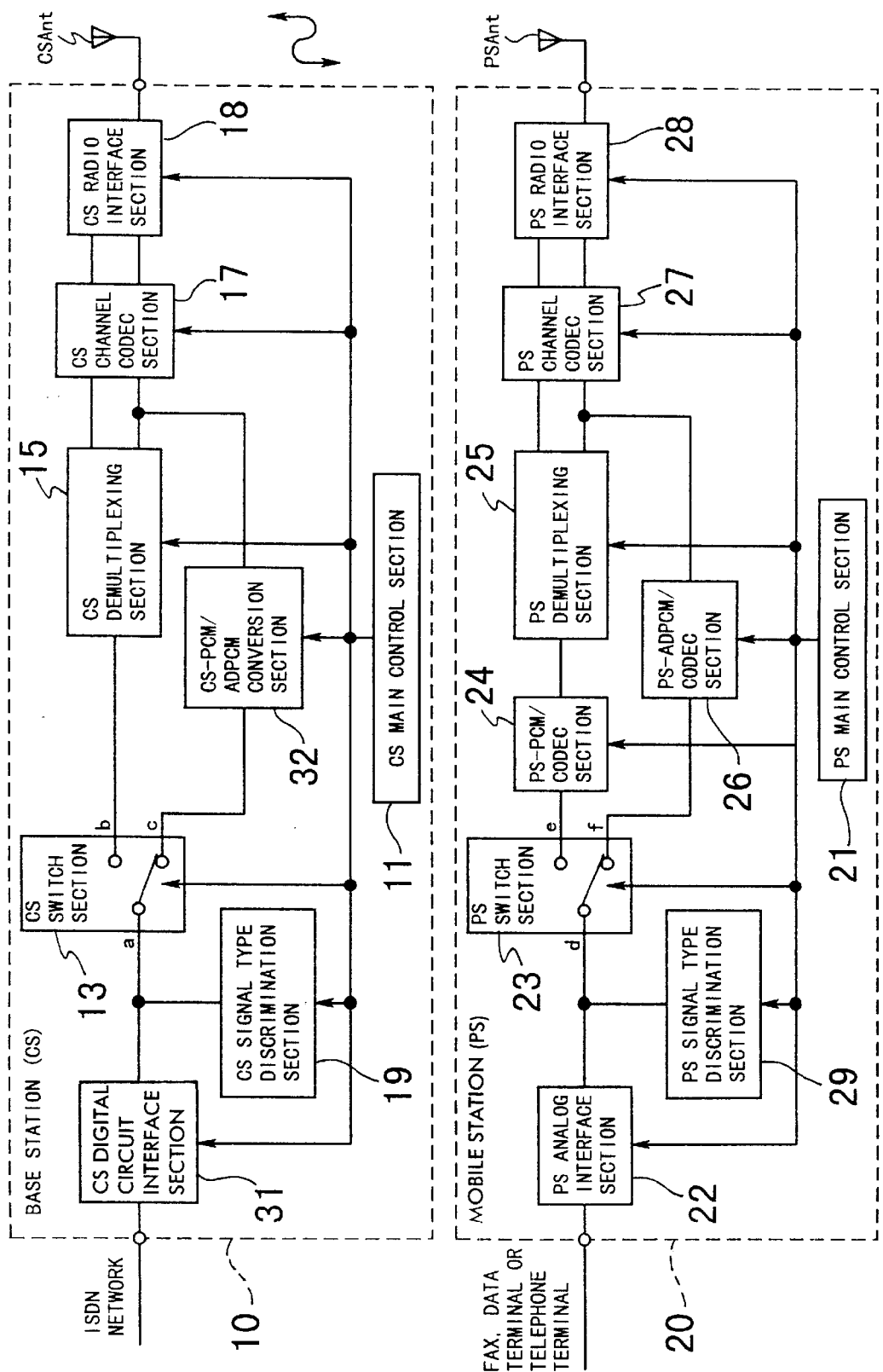
FIG. 4 is a block diagram of another radio communication system to which the present invention is applied where it is connected to an ISDN network.

Referring now to FIG. 4, there is shown in block diagram another radio communication system to which the present invention is applied where it is connected to an ISDN network.

The radio communication system is basically similar to the radio communication system described hereinabove with reference to FIG. 1 except that the base station (CS) 10 is connected to an ISDN network and includes a CS digital circuit interface section 31 for receiving a PCM signal of 64 kbps sent thereto from the ISDN network and a CS-PCM/ADPCM conversion section 32 for performing conversion between a PCM signal of 64 kbps and an ADPCM signal of 32 kbps in place of the CS analog circuit interface section 12, CS-PCM/CODEC section 14 and CS-ADPCM/CODEC section 16 of the base station (CS) 10 of the radio communication system of FIG. 1.

In operation, in the base station (CS) 10, when a PCM signal of 64 kbps sent thereto from the ISDN network is a modem modulation signal from a facsimile modem or a data modem, the CS signal type discrimination section 19 discriminates that the PCM signal of 64 kbps is a modem modulation signal. In response to the discrimination, the CS switch section 13 connects the CS digital circuit interface section 31, which has received the PCM signal of 64 kbps, to the CS demultiplexing section 15 (on between a-b) and forwards the received PCM signal of 64 kbps as it is to the CS demultiplexing section 15. Thereafter, communication with the facsimile machine or data terminal is started in accordance with a processing procedure similar to that in the radio communication system of FIG. 1.

On the other hand, when the PCM signal of 64 kbps sent thereto from the ISDN network is a speech signal, in the base station (CS) 10, the CS signal type discrimination section 19 discriminates that the PCM signal of 64 kbps is a speech signal, and the CS switch section 13 connects the CS digital circuit interface section 31, which has received the PCM signal of 64 kbps, not to the CS demultiplexing section 15 but to the CS-PCM/ADPCM conversion section 32 (on between a–c).

Then, the CS-PCM/ADPCM conversion section 32 converts the received PCM signal of 64 kbps into an ADPCM signal of 32 kbps. The thus converted ADPCM signal of 32 kbps is transmitted to the CS channel CODEC section 17. Thereafter, talking with the telephone terminal is started in accordance with a processing procedure similar to that in the radio communication system of FIG. 1.

It is to be noted that, in transmission, communication and talking via the ISDN network is performed in accordance with a processing procedure reverse to the processing procedure for termination.

Having now fully described the invention, it will be apparent to one of ordinary skill in the art that many changes and modifications can be made thereto without departing from the spirit and scope of the invention as set forth herein.

What is claimed is:

1. A radio communication method for communication between a base station connected to an analog network and a mobile station connected to said base station by a radio circuit, comprising:

receiving an analog signal from said analog network;

determining if said analog signal is a modem signal or a speech signal, performing PCM/CODEC processing of the analog signal determined to be a modem signal to produce a PCM signal;

separating said PCM signal into a plurality of ADPCM signals; said ADPCM signals having a transmission speed lower than a transmission speed of said PCM signal;

allocating said ADPCM signals to time slots by channel CODEC processing;

transmitting said channel CODEC processed signals through said radio circuit; and demodulating at said mobile station the data received from said base station into an analog signal by a processing procedure reverse to the processing procedure by said base station.

2. A radio communication method as claimed in claim 1, further comprising:

performing ADPCM/CODEC processing of the analog signal speech signal to produce a first ADPCM signal;

allocating said first ADPCM signal to a time slot;

transmitting said allocated ADPCM signal through said radio circuit; and demodulating at said mobile station the data received from said base station into an analog signal by a processing procedure reverse to the processing procedure by said base station.

3. A radio communication method for communication between a base station connected to an ISDN network and a mobile station connected to said base station by a radio circuit, comprising:

receiving a PCM modem modulation signal from said ISDN network;

detennining if said PCM signal is a modem signal or a speech signal;

separating said PCM signal determined to be a modem signal into a plurality of ADPCM signals;

said ADPCM signals having a transmission speed lower than that of said PCM signal;

allocating said ADPCM signals to time slots by channel CODEC processing;

transmitting said channel CODEC processed signals through said radio circuit; and demodulating at said mobile station the data received from said base station into an analog signal by a processing procedure reverse to the processing procedure by said base station.

4. A radio communication method as claimed in claim 3, further comprising:

performing PCM/ADPCM processing of the PCM signal determined to be a speech signal to produce a first ADPCM signal having a transmission speed lower than that of said PCM signal;

allocating said first ADPCM signal to a time slot;

transmitting said allocated ADPCM signal through said radio circuit; and demodulating at said mobile station the data received from said base station into an analog signal by a processing procedure reverse to the processing procedure by said base station.

5. A radio communication system, comprising:

a radio base station connected to an analog network; and a mobile station connected to said base station by a radio circuit;

said base station including a main control section for controlling components of said base station, an analog circuit interface section for receiving an outgoing analog signal from said analog network, a signal type discrimination section for discriminating whether said outgoing analog signal received by said analog circuit interface section is a modem modulation signal from a facsimile modem or a data modem or a speech signal, a PCM/CODEC section for modulating said outgoing analog signal from said analog circuit interface section into an outgoing PCM signal of 64 kbps and for conversely demodulating an incoming PCM signal of 64 kbps into an incoming analog modem signal, an ADPCM/CODEC section for modulating the analog signal from said analog circuit interface section into an outgoing ADPCM signal of 32 kbps and for conversely demodulating an incoming ADPCM signal of 32 kbps into an incoming analog speech signal, a switch section for switching connection of said analog circuit interface section alternatively to said PCM/CODEC section or said ADPCM/CODEC section, a demultiplexing section for demultiplexing said outgoing PCM signal of 64 kbps into a plurality of demultiplexed outgoing ADPCM signals of 32 kbps and for conversely multiplexing a plurality of demultiplexed incoming ADPCM signals of 32 kbps into said incoming PCM signal of 64 kbps, a channel CODEC section for performing allocation of communication channels to time slots of said radio circuit and performing framing and deframing of radio frames of a control channel and a communication channel, and a radio interface section for receiving data from said radio circuit and transmitting data through said radio circuit.

6. A radio communication system, comprising:

a radio base station connected to an analog network; and a mobile station connected to said base station by a radio circuit;

said mobile station including a main control section for controlling components of said mobile station, a radio interface section for receiving data from said base station through the radio circuit and transmitting data through said radio circuit, a channel CODEC section for performing allocation of communication channels to time slots of said radio circuit and performing framing and deframing of radio frames of a control channel and a communication channel, a demultiplexing section for performing demultiplexing of an outgoing PCM signal of 64 kbps into a plurality of demultiplexed outgoing ADPCM signals of 32 kbps and for conversely multiplexing a plurality of demultiplexed incoming ADPCM signals of 32 kbps into an incoming PCM signal of 64 kbps, a PCM/CODEC section for demodulating said incoming PCM signal of 64 kbps into an incoming analog modem signal and for conversely modulating an outgoing analog modem signal into said outgoing PCM signal of 64 kbps, an ADPCM/CODEC section for demodulating an incoming ADPCM signal of 32 kbps into an incoming analog speech signal and for conversely modulating an outgoing analog speech signal into an outgoing ADPCM signal of 32 kbps, an analog interface section for performing inputting and outputting processing of an incoming or outgoing analog signal, a switch section for switching the connection of said analog interface section to said PCM/CODEC section or said ADPCM/CODEC section, and a signal type discrimination section for discriminating whether or not said outgoing analog signal received by said analog interface section is a modem modulation signal such as a facsimile modem signal or a data modem signal or a speech signal.

7. A radio communication system, comprising:

a radio base station connected to an analog network; and a mobile station connected to said base station by a radio circuit;

said base station including a base main control section for controlling components of said base station, a base analog circuit interface section for receiving an outgoing base analog signal from said analog network, a base signal type discrimination section for discriminating whether the analog signal received by said analog circuit interface section is a modem modulation signal from a facsimile modem or a data modem or a speech signal, a base PCM/CODEC section for modulating said outgoing base analog signal from said analog circuit interface section into an outgoing base PCM signal of 64 kbps and for conversely demodulating an incoming base PCM signal of 64 kbps into an incoming base analog modem signal, a base ADPCM/CODEC section for modulating said outgoing analog signal from said analog circuit interface section into an outgoing ADPCM signal of 32 kbps and for conversely demodulating an incoming ADPCM signal of 32 kbps into an incoming analog speech signal, a base switch section for switching connection of said analog circuit interface section alternatively to said PCM/CODEC section or said ADPCM/CODEC section, a base demultiplexing section for demultiplexing said outgoing PCM signal of 64 kbps into a plurality of demultiplexed outgoing base ADPCM signals of 32 kbps and for conversely multiplexing a plurality of demultiplexed incoming base ADPCM signals of 32 kbps into said incoming base PCM signal of 64 kbps, a base channel CODEC section for performing allocation of communication channels to time slots of said radio circuit and performing framing and deframing of radio frames of a control channel and a communication channel, and a base radio interface section for receiving data from said radio circuit and transmitting data through said radio circuit;

said mobile station including a mobile main control section for controlling components of said mobile station, a mobile radio interface section for receiving data from said base station through the radio circuit and transmitting data through said radio circuit, a mobile channel CODEC section for performing allocation of communication channels to time slots of said radio circuit and performing framing and deframing of radio frames of a control channel and a communication channel, a mobile demultiplexing section for performing demultiplexing of an outgoing mobile PCM signal of 64 kbps into a plurality of demultiplexed outgoing mobile ADPCM signals of 32 kbps and for conversely multiplexing a plurality of demultiplexed incoming mobile ADPCM signals of 32 kbps into an incoming mobile PCM signal of 64 kbps, a mobile PCM/CODEC section for demodulating said incoming mobile PCM signal of 64 kbps into an incoming mobile analog modem signal and for conversely modulating an outgoing mobile analog modem signal into said outgoing mobile PCM signal of 64 kbps, a mobile ADPCM/CODEC section for demodulating an incoming mobile ADPCM signal of 32 kbps into an incoming mobile analog speech signal and for conversely modulating an outgoing mobile analog speech signal into an outgoing mobile ADPCM signal of 32 kbps, a mobile analog interface section for performing inputting and outputting processing of an incoming or outgoing mobile analog signal, a mobile switch section for switching the connection of said mobile analog interface section to said mobile PCM/CODEC section or said mobile ADPCM/CODEC section, and a mobile signal type discrimination section for discriminating whether or not an outgoing mobile analog signal received by said mobile analog interface section is a modem modulation signal such as a facsimile modem signal or a data modem signal or a speech signal.

8. A radio communication system, comprising:

a radio base station connected to an ISDN network; and a mobile station connected to said base station by a radio circuit;

said base station including a main control section for controlling components of said base station, a digital circuit interface section for receiving an outgoing PCM signal of 64 kbps from said ISDN network, a signal type discrimination section for discriminating whether said outgoing PCM signal received by said digital circuit interface section is a modem modulation signal such as a facsimile modem signal or a data modem signal or a speech signal a PCM/ADPCM conversion section for performing conversion between said outgoing PCM signal of 64 kbps and an outgoing ADPCM signal of 32 kbps, a demultiplexing section for demultiplexing said outgoing PCM signal of 64 kbps into a plurality of demultiplexed outgoing ADPCM signals of 32 kbps and for conversely multiplexing a plurality of demultiplexed incoming ADPCM signals of 32 kbps into an incoming PCM signal of 64 kbps, a switch section for switching connection of said digital circuit interface section alternatively to said demultiplexing section or said PCM/ADPCM conversion section, a channel CODEC section for performing allocation of communication channels to time slots of said radio circuit and performing framing and deframing of radio frames of a control channel and a communication channel, and a radio interface section for receiving data from said radio circuit and transmitting data through said radio circuit.

9. A radio communication system, comprising:

a radio base station connected to an ISDN network; and a mobile station connected to said base station by a radio circuit;

said mobile station including a main control section for controlling components of said mobile station, a radio interface section for receiving data from said base station through the radio circuit and transmitting data through said radio circuit, a channel CODEC section for performing allocation of communication channels to time slots of said radio circuit and performing framing and deframing of radio frames of a control channel and a communication channel, a demultiplexing section for performing demultiplexing of an outgoing PCM signal of 64 kbps into a plurality of demultiplexed outgoing ADPCM signals of 32 kbps and for conversely multiplexing a plurality of demultiplexed incoming ADPCM signals of 32 kbps into an incoming PCM signal of 64 kbps, a PCM/CODEC section for demodulating said incoming PCM signal of 64 kbps into an incoming analog signal and for conversely modulating an outgoing analog modem signal into said outgoing PCM signal of 64 kbps, an ADPCM/CODEC section for demodulating an incoming ADPCM signal of 32 kbps into an incoming analog speech signal and for conversely modulating an outgoing analog speech into an outgoing ADPCM signal of 32 kbps, an analog interface section for performing inputting and outputting processing of an incoming or outgoing analog signal, a switch section for switching the connection of said analog interface section to said PCM/CODEC section or said ADPCM/CODEC section, and a signal type discrimination section for discriminating whether or not said outgoing analog signal received by said analog interface section is a modem modulation signal such as a facsimile modem signal or a data modem signal or a speech signal.

10. A radio communication system, comprising:

a radio base station connected to an ISDN network; and a mobile station connected to said base station by a radio circuit;

said base station including a base main control section for controlling components of said base station, a digital circuit interface section for receiving an outgoing base PCM signal of 64 kbps from said ISDN network, a base signal type discrimination section for discriminating whether the digital signal received by said digital circuit interface section is a modem modulation signal such as a facsimile modem signal or a data modem signal or a speech signal a base PCM/ADPCM conversion section for performing conversion between said outgoing base PCM signal of 64 kbps and an outgoing base ADPCM signal of 32 kbps and for performing conversion between an incoming base ADPCM signal of 32 kbps and an incoming base PCM signal of 64 kbps, a demultiplexing section for demultiplexing said outgoing base PCM signal of 64 kbps into a plurality of demultiplexed outgoing base ADPCM signals of 32 kbps and for conversely multiplexing a plurality of demultiplexed incoming base ADPCM signals of 32 kbps into said incoming base PCM signal of 64 kbps, a base switch section for switching connection of said digital circuit interface section alternatively to said demultiplexing section or said PCM/ADPCM conversion section, a base channel CODEC section for performing allocation of communication channels to time slots of said radio circuit and performing framing and deframing of radio frames of a control channel and a communication channel, and a radio interface section for receiving data from said radio circuit and transmitting data through said radio circuit;

said mobile station including a mobile main control section for controlling components of said mobile station, a mobile radio interface section for receiving data from said base station through the radio circuit and transmitting data through said radio circuit, a mobile channel CODEC section for performing allocation of communication channels to time slots of said radio circuit and performing framing and deframing of radio frames of a control channel and a communication channel, a mobile demultiplexing section for performing demultiplexing of an outgoing mobile PCM signal of 64 kbps into a plurality of demultiplexed outgoing mobile ADPCM signals of 32 kbps and for conversely multiplexing a plurality of demultiplexed incoming mobile ADPCM signals of 32 kbps into an incoming mobile PCM signal of 64 kbps, a mobile PCM/CODEC section for demodulating said incoming mobile PCM signal of 64 kbps into an incoming mobile analog modem signal and for conversely modulating an outgoing mobile analog modem signal into said outgoing mobile PCM signal of 64 kbps, a mobile ADPCM/CODEC section for demodulating an incoming mobile ADPCM signal of 32 kbps into an incoming mobile analog speech signal and for conversely modulating an outgoing mobile analog speech signal into an outgoing mobile ADPCM signal of 32 kbps, a mobile analog interface section for performing inputting and outputting processing of an incoming or outgoing mobile analog signal, a mobile switch section for switching the connection of said mobile analog interface section to said mobile PCM/CODEC section or said mobile ADPCM/CODEC section, and a mobile signal type discrimination section for discriminating whether or not an outgoing mobile analog signal received by said mobile analog interface section is a modem modulation signal such as a facsimile modem signal or a data modem signal or a speech signal.

* * * * *